April 28, 1953 P. HOLLOP 2,636,496

CARD FILE

Filed Nov. 2, 1949

INVENTOR.
PAUL HOLLOP

BY Marvin [signature]

ATTORNEY.

Patented Apr. 28, 1953

2,636,496

UNITED STATES PATENT OFFICE 2,636,496

CARD FILE

Paul Hollop, Gross-Denkte, uber Wolfenbuttel, Germany

Application November 2, 1949, Serial No. 125,092

2 Claims. (Cl. 129—16)

The present invention relates to word forming devices provided in the form of a card retaining file, the same being one of a plurality of card retaining file units together making up the word forming device.

The main object of the invention is to provide a word forming device wherein card retaining files are grouped together to facilitate demonstrating and teaching of words by means of the cards in the files.

Another object is to form such card retaining files of upwardly open cases having ends and upper and lower side elements for removably retaining rectangular cards in upstanding position therein, and means upon the cards facilitating removal and replacement of the cards at will.

A further object is specifically to provide the cards with slotted portions extending upwards a predetermined distance from the bottom to allow the lower end along one side to be flexed inwardly to facilitate the insertion or removal of the card with respect to the file or case involved. Further objects and the advantages of the invention will become obvious as the specification is read in conjunction with the drawings herewith.

Figure 1:
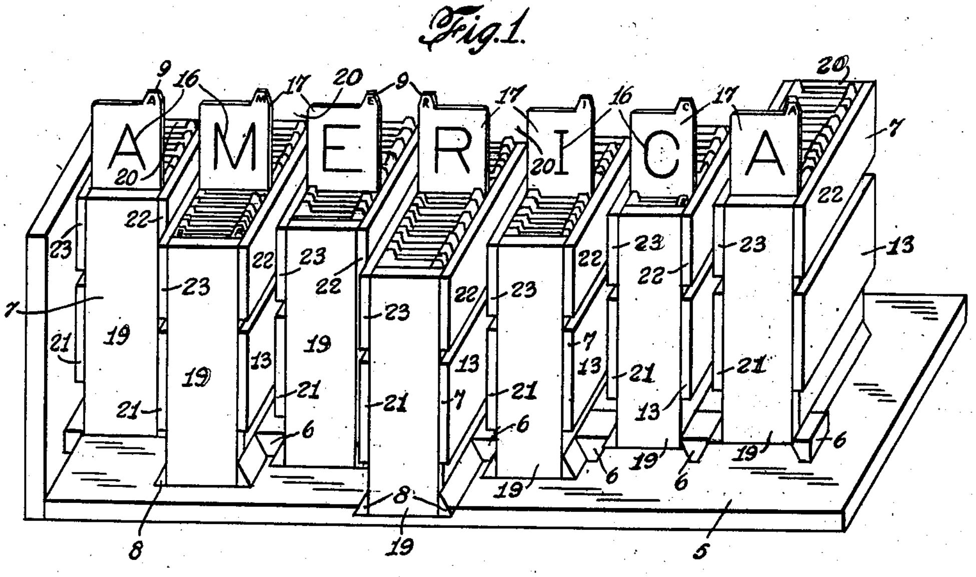
Fig. 1 is a perspective view of an apparatus embodying my invention.
Figure 2:
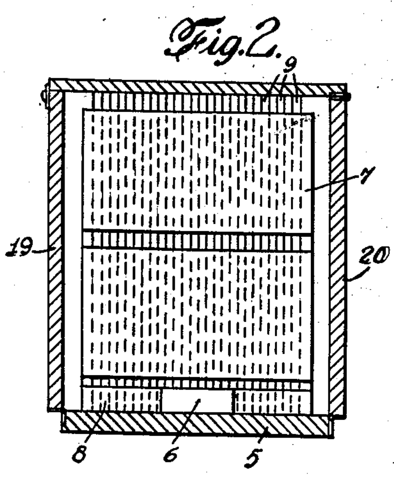
Fig. 2 is a side elevation, partly in section of an alphabet card retaining case or unit forming a card file from the apparatus of Fig. 1.
Figure 3:
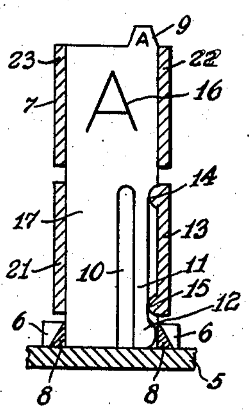
Fig. 3 is a front elevation, partly in section of Fig. 2.
Figure 4:
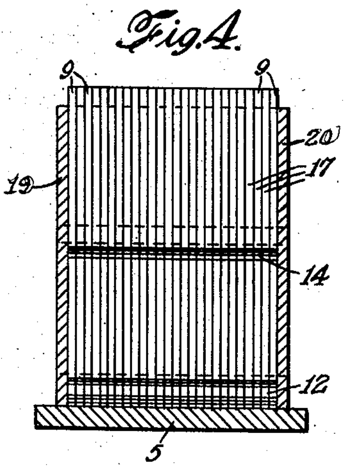
Fig. 4 is a side elevation, partly in section showing the alphabet cards in their relative position.

Referring to Fig. 1, a base plate 5 has secured thereto a series of dove-tail members 6, spaced apart and parallel with each other to form a plurality of guideways. The card retaining files or cases 7 each are equipped with lower angular means 8 which cooperate with the said dovetail members to slide therein thereby affording the means by which any one or all of the files or cases 7 may be moved forward or back for the purpose hereinafter specified. Each of the files or cases 7, contains cards 17 bearing a letter 16 of the alphabet, preferably with the card bearing the first letter of the alphabet in the forward position, as indicated in the drawing. Preferably each card 17 has an index tab 9 bearing the same letter or character carried by the card 17. Preferably, each card has a slot 10 cut in it forming a cut out portion providing a relatively narrow pendent leg 11 and having formed at its lower portion a slightly extended lobe 12. Each case 7 includes the front and back upright ends 19 and 20, the lower sides of which are connected by lower side wall elements 13 and 21, while the upper sides are connected by upper side wall elements 22 and 23. The side wall element 13 forming part of each card retaining file or case 7 is provided with an inwardly projecting integral lobe 14 upon the upper portion of which the lobe 12 carried by the card 17 rests when the card has been raised up to expose the letter which it bears. The side wall element 13 may also be provided with a lobe 15 at its lower portion thus providing the means for retaining the cards normally against falling out of the file or case in case the apparatus is inverted. From the above it will be seen that my device comprises a plurality of upwardly open card containers or card retaining files or cases, arranged by any suitable means so that the said cases positioned side-by-side may be moved individually forward or back relative to each other and that each file or case contains a plurality of cards each bearing a letter of the alphabet arranged in alphabetical order from front to back. In operating the device, a word is selected and each letter of the word is progressively set up by raising the card bearing that particular letter. Some of the letters of the word selected will be forward and others to the rear, in fact, depending upon the word, letter carrying cards may be raised in various parts of the several files or cases. Accordingly, in order to make the reading of the word clear and legible by bringing all of the cards in line, the several cases are manually adjusted by moving the same forward or back until all of the exposed cards are in register. Among the advantages of my system are the rapid composing of words, constant alteration of the word picture and hence the necessity for the student to read instead of learning words by heart. Use of the system speeds up the rate at which students may learn to spell new words and the spelling of a word may be presented in any type of character desired. The instructor positioned behind the apparatus may keep his students in view while setting up the test words. Also the student may operate the system and thus indicate whether the lesson has been understood and learned. The advantage of having all of the equipment in compact and easily manipulated form is important and time saving and the desirability of having all of the cards in register when presenting a word can be appreciated. In Fig. 3 a complete card 17 is shown with the large character 16 in place thereon as indicated by the small character on the tab 9.

Having illustrated and described my invention and described some of its uses and advantages and having disclosed a preferred em- embodiment thereof I desire it to be understood that certain structural changes and modifications may be made therein without departing from the spirit of the invention as set forth in the following claims.

I claim:

1. A card retaining file including an upwardly open case having front and rear ends and side wall means upon one side connecting said ends, an upper side wall element upon the other side also connecting the ends, a lower side wall element likewise connecting the ends below the upper side wall element and having an upper and a lower inwardly directed elongated lobe within the upper and lower edges thereof, a plurality of substantially rectangular cards normally carried in the case in standing position, each card having an elongated cut out portion along one edge at the side thereof registering with the elongated lobes of the lower side wall element, and means facilitating the insertion and removal of the cards into and from the case including a downwardly open slotted portion in each card allowing the lower portion of the card toward one side to be flexed along the cut out portion of the card.

2. A card retaining file according to claim 1, wherein the slotted portion is disposed a short distance from the side of each card having the cut out portion but a much greater distance from the opposite edge, and wherein the slot in the slotted portion extends upwardly parallel to the cut out portion and is of substantially the same height therewith so that the side of the card having said cut out portion forms a relatively narrow and flexible pendent leg while the other side of the card is relatively rigid and unyielding laterally.

PAUL HOLLOP.

References Cited in the file of this patent

UNITED STATES PATENTS

| Number | Name | Date |
| --- | --- | --- |
| 724,173 | Evans | Mar. 31, 1903 |
| 1,489,346 | Davis | Apr. 8, 1924 |
| 1,648,822 | Radford | Nov. 8, 1927 |
| 2,176,183 | Krieg | Oct. 17, 1939 |
| 2,239,840 | Casey | Apr. 29, 1941 |
| 2,261,840 | Bergmann | Nov. 4, 1941 |

FOREIGN PATENTS

| Number | Country | Date |
| --- | --- | --- |
| 37,198 | Germany | Oct. 1, 1886 |
| 98,052 | Germany | June 30, 1898 |
| 461,959 | France | 1913 |
| 396,239 | Great Britain | 1933 |